United States Patent Office 3,436,362
Patented Apr. 1, 1969

3,436,362
HALOGEN-CONTAINING POLYMERS AND POLYOLEFINS STABILIZED WITH URACILS
Dieter H. A. Hayer, Stuttgart-Bad Cannstatt, and Lore Grozinger, Stuttgart-Feuerbach, Germany, assignors to G. Siegle & Co. G.m.b.H., Stuttgart, Germany
No Drawing. Filed Feb. 6, 1967, Ser. No. 614,001
Claims priority, application Germany, Feb. 12, 1966, S 101,985
Int. Cl. C08f 45/60, 45/58
U.S. Cl. 260—23.7        5 Claims

ABSTRACT OF THE DISCLOSURE

Polymers are stabilized against the deleterious effects of light and heat by incorporating therewith an effective amount of a compound having the general formula:

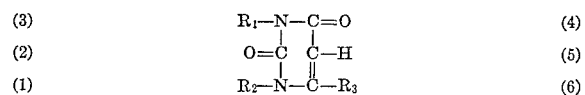

wherein $R_1$, $R_2$, and $R_3$ are monovalent substituents selected from the group consisting of hydrogen, halogen, hydroxyl, alkyl, aryl, aralkyl, acyl, amino, aminoalkyl, aminoaryl and hydrazino groups. In one preferred variant of the invention, the polymer may be polyvinyl chloride and the stabilizer of the invention incorporated therewith may be 1,3-dimethyl-6-aminouracil.

---

This invention broadly relates to polymers stabilized against the deleterious effects of light and heat and to a method of preparing the same. In one of the more specific variants, the invention is concerned with the stabilization of polyvinyl chloride.

The invention will be illustrated and described hereinafter with specific reference to the homopolymer of vinyl chloride, i.e., polyvinyl chloride. However, it is understood that the invention is also useful in stabilizing a wide variety of polymers, including, but not limited to, homopolymerizates of halogenated vinyl compounds in general, copolymerizates of halogenated vinyl compounds with other ethylenically unsaturated monomers copolymerizable therewith such as vinyl alcohol or vinyl acetate, copolymers of two or more halogenated vinyl compounds such as vinyl chloride and vinylidene chloride, and polyolefins in general, including homopolymers of alpha-monoolefins containing, for example, 2–10 carbon atoms, interpolymers of two or more of such alphamonoolefins, and interpolymers thereof with polyenes such as butadiene and other conjugated dienes. Specific examples of polymers which may be stabilized include polyvinyl chloride, copolymers of vinyl chloride and vinyl acetate, copolymers of vinyl chloride and vinylidene chloride, polyethylene and polypropylene. The homopolymers and copolymers mentioned above are commercial products, and in instances where copolymers are stabilized, the chemically bound monomer contents thereof may be the same as in the commercially available products.

Light and heat are known to decompose polymers, and especially the polymerizates and copolymerizates of halogenated vinyl compounds such as polyvinyl chloride. Light and heat also decompose the polyolefins and their halogenated products.

A wide variety of stabilizing agents, many of which are described in the literature and in issued patents, have been added to polymers to suppress the above described decomposition phenomena. However, almost without exception it was necessary heretofore that one stabilizer be added to suppress decomposition due to the action of light, and that a different stabilizer be added to suppress decomposition due to the action of heat. Obviously, it would be advantageous to provide a single stabilizing agent which effectively suppresses both types of decomposition, but no stabilizers were known heretofore which effectively stabilized against light and heat.

It is an object of the present invention to provide novel stabilized polymers and a method of preparing the same.

It is still a further object to provide stabilized polyvinyl chloride which contains a stabilizing agent of the invention, and a method for the preparation thereof.

Still other objects and advantages of the invention will be apparent to those skilled in the art from the following detailed description and the example.

It has been discovered that compounds having the following general formula:

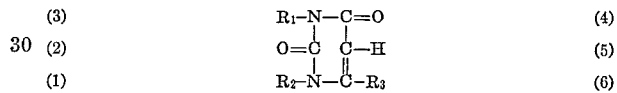

wherein $R_1$, $R_2$ and $R_3$ are monovalent substituents selected from the group consisting of hydrogen, halogen, hydroxyl, alkyl, aryl, aralkyl, acyl, amino, aminoalkyl, aminoaryl and hydrazino groups, are capable of stabilizing polymers of the types described herein against light and heat decomposition. The substituents $R_1$, $R_2$ and $R_3$ may be the same or different. The alkyl, acyl and aminoalkyl groups may contain, for example, 1–10 carbon atoms, and the aryl, aralkyl and aminoaryl groups may contain, for example, 6–20 carbon atoms. Specific examples of suitable compounds for use in practicing the invention include, for example, 1-acetyluracil, 6-aminouracil, 1-p-chlorophenyluracil, 3 - butyluracil, 1,3-dimethyl-6-aminouracil, 1,3-dimethyl-6-butylaminouracil, 1,3-dimethyl-6-anilinouracil, 1,3-dimethyl-6-hydrazinouracil, 1-benzyl-6-methyl-3-phenyluracil and 1,3-dimethyl-6-chlorouracil. These compounds may be prepared in the usual manner.

The above described stabilizing agents of the invention may be added to the polymer in an amount to produce a noticeable stabilizing effect, such as 0.01–10% by weight of the polymer, and preferably 0.05–2% by weight. The stabilizing agent may be admixed in the polymer so as to be uniformly dispersed therein by any convenient prior art process, such as by means of callendering rolls, roll mills in general, and other mixing devices. If desired, the stabilized polymers thus produced may be further compounded and processed in accordance with prior art techniques, and/or then formed into desired articles which are stabilized against decomposition due to the effects of light and heat.

The stabilizing agents of the present invention are very effective for stabilizing the polymers described herein against light and heat when used alone. Nevertheless, it is possible to add still other substances and obtain improved results. For instance, aldehydes, organic phosphites, metal containing stabilizing agents, and/or epoxy compounds may be added.

The aldehydes to be added include saturated or unsaturated straight and branched chain aliphatic aldehydes, substituted or unsubstituted aromatic aldehydes, saturated or unsaturated substituted and unsubstituted carbocyclic aldehydes, and substituted or unsubstituted heterocyclic aldehydes. The above aldehydes may contain, for example, 2–24 carbon atoms. Specific examples of aldehydes include 2,3-dimethoxybenzaldehyde, isobutyraldehyde, terephthalaldehyde and furfural, but it is understood that a wide variety of other suitable aldehydes may be employed.

The amount of aldehyde to be incorporated with the polymer may vary over wide ranges. Preferably, about 0.01–10% by weight of the polymer is added, and for best results about 0.05–2% by weight. The aldehyde may be incorporated with the polymer following the same procedures as discussed above for the stabilizing agent of the invention.

The stabilizing agents of the invention may be combined with other stabilizing agents which have been previously described in the literature in an amount of, for example, 0.01–10% by weight of the polymer. Specific examples which have been found to yield excellent results include commercial barium and/or cadmium-containing stabilizers. The stabilizing agents may also be combined with metal soaps and/or other stabilizing agents that contain, or do not contain, a metal such as barium and/or cadmium.

Very good results may be obtained by using a combination of the stabilizing agents of the invention and the organic phosphite stabilizing agents described in the prior art. Specific examples of organic phosphites which may be used include triphenyl phosphite, triethyl phosphite, diphenyl-2-ethylhexyl phosphite, diphenylbenzyl phosphite, 2-ethylbutyl-bis - (p-tert-octyl) - phenyl phosphite, ethyldioleyl phosphite, oleylditolyl phosphite, and 1,2,5,6-tetrahydroxybenzyl-di-o-tolyl phosphite.

The above phosphites may be added in an amount of, for example, 0.1–10% by weight of the polymer, and preferably in an amount of 0.5–2% by weight. The organic phosphites may be incorporated with the polymer following the same procedure as described for the stabilizing agents of the invention.

A wide variety of epoxy compounds of natural or synthetic origin may be combined with the stabilizing agents of the invention. Examples of suitable epoxy compounds include epoxidized vegetable oils, such as epoxidized soybean oil and similar epoxidized oils, methyl-9,10-epoxyoctadecanoate, di-9,10-epoxyoctadecanoate, cyclohexene oxide, 4,4′-di - (2,3-epoxypropoxy) - benzophenone, and mesityl oxide epoxide. The epoxy compounds may be added in an amount of, for example, 0.2–20% by weight of the polymer, and preferably in an amount of about 0.5–10% by weight.

The superior stabilizing action of the stabilizing agents of the invention is shown by the data in the following specific example. It is understood that the following example is given solely for purposes of illustration, and that it in no way restricts the spirit or scope of the invention.

EXAMPLE

A basic recipe was prepared containing 70 parts by weight of polyvinyl chloride, 30 parts by weight of dioctylphthalate as a plasticizer, and 0.2 part by weight of a commercial glycerol-fatty acid ester lubricant sold under the trade name "Loxiol G-10." A series of compositions to be tested was prepared by adding the additives listed in the table below to portions of the basic recipe.

A series of test samples was prepared by passing the above mentioned mixtures through a roll mill for 10 minutes to form a series of sheets therefrom. Sample portions of the sheets thus produced were subjected to a thermal stability test and a light exposure test following the usual practices. In the thermal stability test, the samples were placed in an oven maintained at 180° C., allowed to remain in the oven until they were preceptibly discolored, and the time in minutes at which the discoloration was first noted was recorded. A second series of the samples was exposed to light in a commercial fadeometer, allowed to remain therein until discolored, and the time in hours required for discoloration was recorded. The results thus obtained for a series of stabilizing agents of the invention are given below in the following table.

TABLE

| Stabilizing agent (parts by weight) | Decomposition time at 180° C. (minutes) | Hours of exposure to light in a fadeometer |
|---|---|---|
| 1 part expoxidized soybean oil | 30 | 900 |
| 0.2 part 1,3-dimethyl-6-aminouracil | 75 | 1,200 |
| 0.2 part 1,3-dimethyl-6-anilinouracil | 60 | 1,300 |
| 0.14 part 1,3-dimethyl-6-aminouracil 0.06 part p-methoxybenzaldehyde | 75 | 1,200 |
| 0.2 part 1,3-dimethyl-6-aminouracil 1 part epoxidized soybean oil | 105 | 1,400 |
| 0.14 part 1,3-dimethyl-6-aminouracil 0.06 part 3,4-dimethoxybenzaldehyde 1 part epoxidized soybean oil | 105 | 1,500 |
| 0.2 part 1,3-dimethyl-6-aminouracil 0.1 part diphenyldecyl phosphite 1 part epoxidized soybean oil | 105 | 1,500 |
| 1 part 1,3-dimethyl-6-aminouracil 0.25 part trinonylphenyl phosphite 2 parts epoxidized soybean oil | 150 | 1,800 |

What is claimed is:

1. A heat and light stabilized polymer composition consisting essentially of between about 0.01 and 10 parts by weight of a stabilizer per 100 parts by weight of a polymer subject to decomposition by heat and light selected from the group consisting of homopolymerizates of halogenated vinyl compounds, interpolymerizates of at least two halogenated vinyl compounds, interpolymerizates of halogenated vinyl compounds and ethylenically unsaturated halogen-free monomers which are interpolymerizable therewith and polyolefins, the stabilizer being admixed in the polymer and consisting essentially of a compound having the general formula:

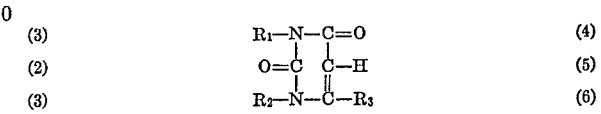

wherein $R_1$, $R_2$ and $R_3$ are monovalent substituents selected from the group consisting of hydrogen, halogen, hydroxyl, alkyl, aryl, aralkyl, acyl, amino, aminoalkyl, aminoaryl and hydrazino groups.

2. The heat and light stabilized polymer composition of claim 1 wherein the polymer is selected from the group consisting of polyvinyl chloride, copolymers of vinyl chloride and vinyl acetate, copolymers of vinyl chloride and vinylidene chloride, polyethylene and polypropylene.

3. The heat and light stabilized polymer composition of claim 1 wherein the polymer is polyvinyl chloride.

4. The heat and light stabilized polymer composition of claim 1 wherein between about 0.05 and 2 parts by weight of the stabilizer are admixed with each 100 parts by weight of the polymer.

5. The heat and light stabilized polymer composition of claim 1 wherein a substance is admixed with the polymer selected from the group consisting of:

(a) aliphatic, aromatic, carbocyclic and heterocyclic aldehydes containing about 2–24 carbon atoms, organic phosphites, and organometallic compounds of barium and cadmium in an amount of 0.1–10% by weight of the polymer, and (b) epoxy compounds in an amount of 0.2–20% by weight of the polymer.

References Cited

UNITED STATES PATENTS

| | | | |
|---|---|---|---|
| 2,567,651 | 9/1951 | Papesch et al. | 260—260 |
| 2,919,259 | 12/1959 | Naylor et al. | 260—45.95 |
| 2,997,454 | 8/1961 | Leistner et al. | 260—45.8 |
| 3,325,445 | 6/1967 | Harris et al. | 260—45.8 |
| 3,325,499 | 6/1967 | Poos | 260—294 |
| 3,360,520 | 12/1967 | Luckenbaugh et al. | 260—260 |

DONALD E. CZAJA, *Primary Examiner.*

R. A. WHITE, *Assistant Examiner.*

U.S. Cl. X.R.

260—23, 45.7, 45.75, 45.8, 256.4, 260